United States Patent [19]
Blackburn

[11] Patent Number: 5,915,728
[45] Date of Patent: Jun. 29, 1999

[54] GUARD FOR VEHICLES

[76] Inventor: Clyde Blackburn, 493 Lower Stringtown Rd., Burnwell, Ky. 41514

[21] Appl. No.: 08/891,798

[22] Filed: Jul. 14, 1997

[51] Int. Cl.[6] ........................................................ B62B 9/14
[52] U.S. Cl. ............................ 280/847; 180/346; 180/84; 296/77.1; 293/1; 298/1 R; 298/15 G; 280/152.3; 280/154; 280/157
[58] Field of Search ................................. 280/847, 152.3, 280/154, 157; 180/346; 298/1 R, 1 SG; 296/77.1; 293/1

[56] References Cited

U.S. PATENT DOCUMENTS

| | | | |
|---|---|---|---|
| 1,572,460 | 2/1926 | Banschbach | 280/847 |
| 2,769,503 | 11/1956 | Wagner | 180/89.17 |
| 3,463,508 | 8/1969 | Killen | 280/847 |
| 4,003,444 | 1/1977 | Nobutomo | 180/346 |
| 4,077,141 | 3/1978 | Stedman | 280/847 X |
| 4,325,444 | 4/1982 | Anami | 180/346 |
| 4,339,016 | 7/1982 | Gerresheim | 180/89.17 |
| 4,813,507 | 3/1989 | Tanaka et al. | 280/80.1 |
| 5,373,902 | 12/1994 | Lindblom | 172/112 |

FOREIGN PATENT DOCUMENTS

| | | | |
|---|---|---|---|
| 651143 | 10/1962 | Canada | 280/847 |

*Primary Examiner*—Christopher P. Ellis
*Attorney, Agent, or Firm*—Richard C. Litman

[57] ABSTRACT

A guard for vehicles protects the axle housing and proximate components from falling rocks and road debris. The device has a central mount that attaches onto the differential unit portion of the axle housing. The mount partially protects the differential unit. In addition, at least two shields are hinged onto the central mount. The shields can cover the segments of the exposed axle housing and said shields can be locked into place. The shields can be unlocked and swung from the central mount to allow for inspection, maintenance, and cleanup of the axle housing and its proximate components.

12 Claims, 5 Drawing Sheets

GUARD FOR VEHICLES

BACKGROUND OF THE INVENTION

1. Field of the Invention

The present invention relates generally to devices which protect vehicle components that are vulnerable to falling rocks and road debris.

2. Description of Related Art

Various covers for vehicle components have been developed in the past. Vehicle fenders and skid plates are examples of devices that are designed to protect the vehicle body and key components such as the engine and transmission.

Commercial vehicles, particularly rock trucks, are highly vulnerable to falling rocks and earth that are dropped by the excavators of inloaders onto the bed of the vehicle. Typically, the excavator of an inloader scoops up rocks or dirt. The excavator is then swung toward the bed of a rock truck and its contents are released onto the bed. However, during this motion, many rocks fall out of the excavator, missing the bed of the truck. These falling rocks can weigh in excess of ten tons and can seriously damage unprotected vehicle components.

Specifically, the rear axle housing and its proximate components, which may include the oil filter housing and differential sight glass, are susceptible to damage by rocks that are dropped on or near the truck bed. Such components are not heavily protected and they can easily be damaged.

In addition, vehicles, including rock trucks, that are driven on rocky terrains are also vulnerable to damage from road debris. Even lighter debris, such as soil and sand, tends to be "sandblasted" toward the rear of the vehicle, contributing to the general deterioration of these parts.

Debris in the form of large rocks will not only crush lightly protected vehicle components but also dent, crack or warp even the more heavily constructed rear axle housing, causing damage to the axle and differential unit.

Hence, the rear components of the vehicle, including the axle housing and its proximate components, must be frequently cleaned and inspected for damage to properly maintain the vehicle. Any damage to the axle and its proximate components will most certainly add to the cost of maintaining the vehicle.

Accordingly, a need will be seen for a protective device that can shield the axle housing and its proximate components from falling rocks and road debris. In addition, there is a need for a device as described above that is easily mountable and removable (for quick inspection of components and cleanup) and economical to produce.

U.S. Pat. No. 4,813,507 issued to Tanaka et al. on Mar. 21, 1989 describes an axle beam with a protective member designed to prevent deformation of the axle beam. Holes are drilled into the axle beam to accommodate bolts that secure the protective member onto the axle beam. The purpose of the protective member is to deflect or divert the force of impact away from the axle beam by acting as a skid plate. Only one face of the axle is protected and no measures are taken to prevent small dirt particles from flying toward and accumulating onto the axle beam. Further, once installed, the protective member cannot be easily removed to allow for the inspection and cleanup of the axle beam. More importantly, the device cannot protect components from falling rocks.

U.S. Pat. No. 4,044,444 issued to Nobutomo et al. on Jan. 18, 1977 describes a construction that welds a brake case cover, a rear wheel axle case and terminal speed reduction case, to avoid more expensive casting methods of manufacture. It discloses the welding of a fender onto the rear wheel axle housing. A fender attached in this manner cannot adequately prevent debris kicked by the vehicle's tires from damaging the rear axle housing and its proximate components. This device is too lightly constructed to prevent vehicle damage by falling rocks.

U.S. Pat. No. 1,572,460 issued to Banschbach on Feb. 1, 1926 describes an automobile fender and guard combination. The main object of this invention is to ward off damage from accidents or collisions. This device does not provide for a specific guard for the rear axle housing. The rear axle is not protected from road debris. The disclosed extension of the rear bumper, close to the ground, will tend to trap road debris and ricochet some of the debris toward the rear axle housing. This device cannot adequately protect vehicle components from falling debris.

U.S. Pat. No. 4,339,016 issued to Gerresheim on Jul. 13, 1982 describes a tiltable fender for a tractor loader. The fender is tiltable laterally outwardly and downwardly to facilitate easier access to the engine compartment. This device does not adequately protect the axle or its proximate components from falling rocks or road debris.

U.S. Pat. No. 2,769,503 issued to Wagner on Nov. 6, 1956 describes a pivotally mounted fender for cab-over-engine vehicles. The fenders are hinged on one end to the body and can be swung outwardly for easier access to the engine. This device cannot adequately protect vehicle components from falling rocks or road debris.

None of the above noted inventions and patents, taken either singly or in combination, is seen to describe the instant invention as claimed.

SUMMARY OF THE INVENTION

The present invention is a guard for protecting the axle housing and proximate components of a vehicle from falling rocks and road debris. The device has a central mount that attaches onto the differential unit portion of the axle housing. The mount partially protects the differential unit. In addition, at least two shields are hinged onto the central mount to allow the shields to be swung from an open position to a protective position for use during travel by the vehicle. The shields cover the segments of the exposed axle housing and the shields can be locked into place while in the protective position. The shields can be unlocked and swung into the open position to allow for inspection, maintenance, and cleanup of the axle housing and its proximate components.

Accordingly, it is a principal object of the present invention to provide a guard for vehicles which effectively shields substantial portions of the axle housing and its proximate components from falling rocks and road debris.

Another of the objects of the present invention is to provide a guard for vehicles which is easily mounted onto the vehicle.

Yet another of the objects of the present invention is to provide a guard for vehicles, parts of which are readily removable to permit easy access to the axle case and its proximate components.

Still another of the objects of the present invention is to provide a guard for vehicles which is economical to produce.

A further object of the present invention is to provide a guard for vehicles which can easily be secured to the vehicle.

An additional object of the present invention is to provide a guard for vehicles which includes attachments on the vehicle for the rear guard to attach.

A final object of the present invention is to provide a guard for vehicles which includes shields that can be independently opened and closed while the guard is still mounted to the vehicle.

These and other objects will more readily appear as the nature of the invention is herein after more fully described, illustrated and claimed with reference being made to the attached drawings.

DETAILED DESCRIPTION OF THE PREFERRED EMBODIMENTS

The device of the applicant's invention effectively protects substantial portions of the rear axle housing of vehicles and key components, including the oil filter housing and differential sight glass, as well as segments of various cables, hydraulic lines, etc. that are positioned proximate to the axle housing. The invention requires few moving components and it is highly durable and economical to produce.

Embodiments of the aspects of the present invention will now be explained with reference to the accompanying drawings. By way of illustration and not limitation, FIGS. 1 to 5 are presented to show the preferred embodiments of the applicant's invention.

Figure 1:
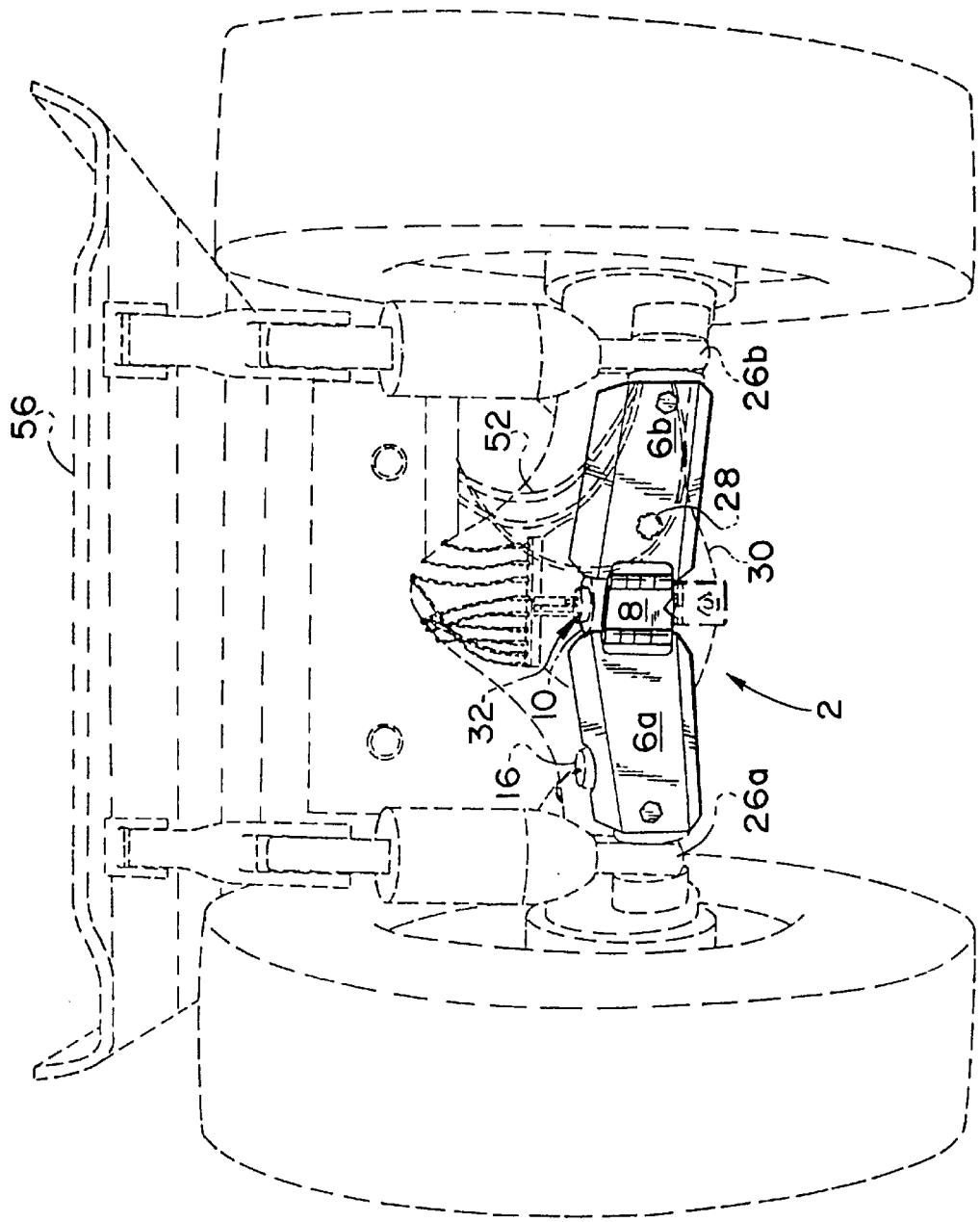
FIG. 1 is an end view of the guard attached near the rear axle housing of a rock truck.
Figure 3:
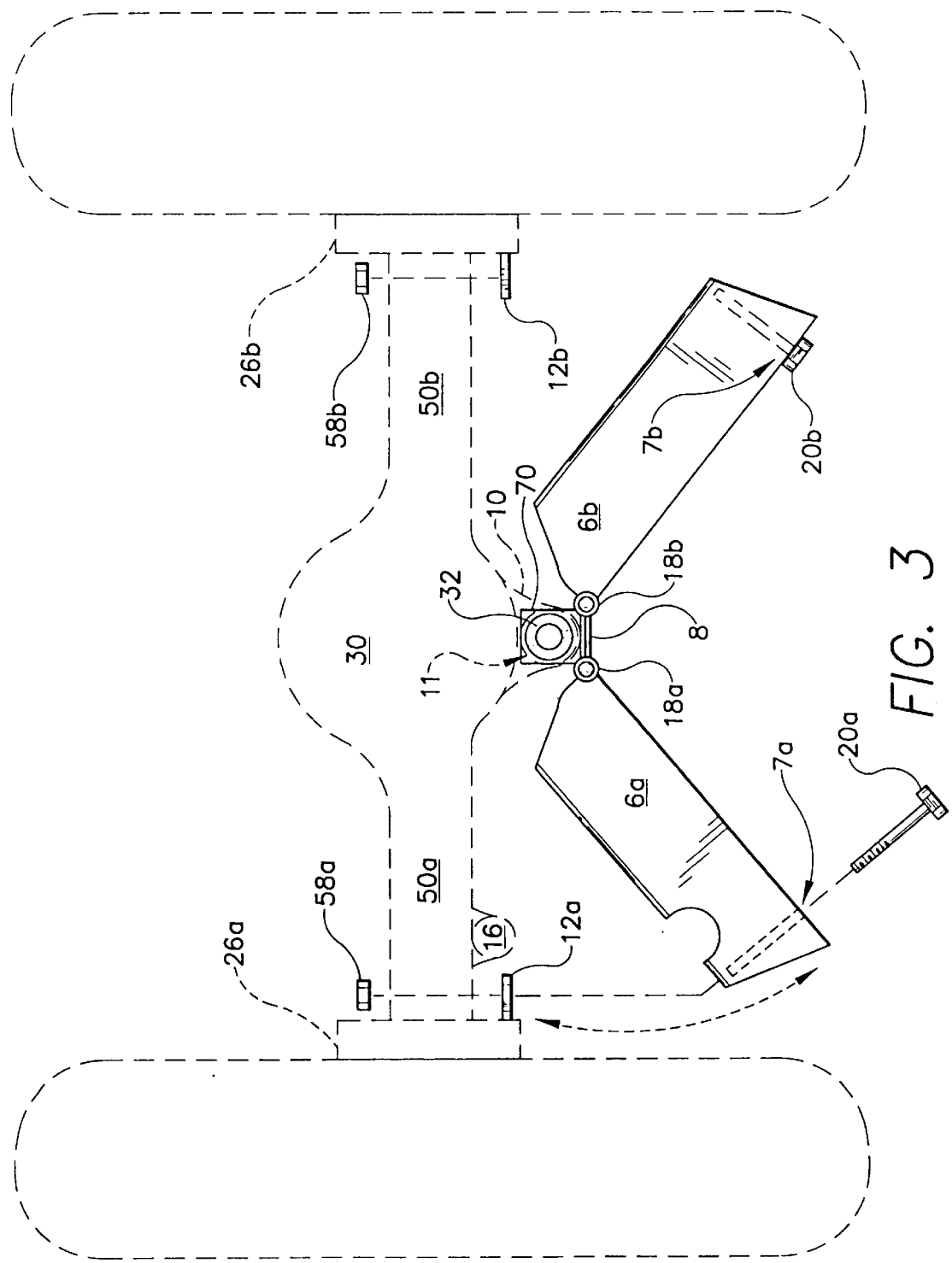
FIG. 3 is a plan view of the guard shown in FIG. 1 with the left and right shields in partially open positions.
Figure 4:
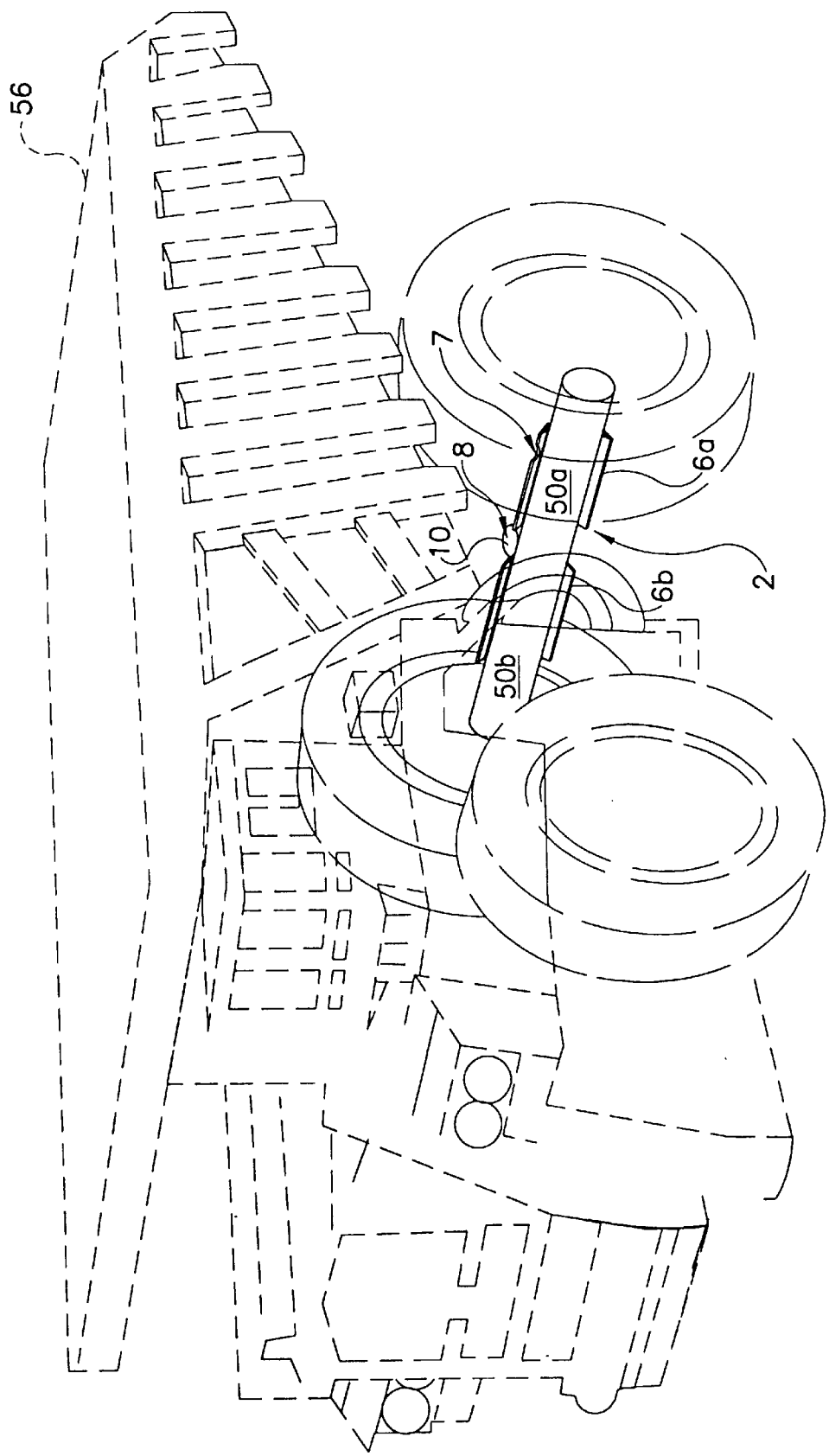
FIG. 4 is an environmental view of the guard attached near the rear axle of a rock truck.

FIG. 4 is an environmental perspective view of a guard 2 attached to a heavy truck, preferably a rock truck as shown. The end view of a rock truck is shown in FIG. 1 with the guard 2 fixedly attached onto a pre-existing safety latch housing 10 (see plan views of the present invention in FIGS. 2 and 3). The safety latch housing 10 protrudes generally horizontally from the center-portion of the axle housing 30 toward the rear of the vehicle. The safety latch housing comprises a pair of parallel eyes spaced apart to define a horizontal passage (not shown) into which the guard 2 seats, each eye including a receiving aperture 11 (a vertical channel). During normal truck operations, the safety latch housing 10 is intended to receive cables (not shown) that are attached to the truck bed 56. A latch locking means 32 (a modified pin) is provided for insertion into the receiving aperture 11 to hold the cables which secure the bed 56 to the truck axle.

The guard employs the safety latch housing 10 as a mounting support. The guard includes a center mount 8 which includes a slide-in member 70 (a tang) with a receiving aperture (not shown), the tang cooperating with the safety latch housing 10 so that the receiving aperture aligns in registry with the receiving aperture of each eye of the safety latch housing 10 while the tang resides in the horizontal passage. The latch locking means 32 can therefore be inserted through the receiving aperture (not shown) of the slide-in member 70 to secure the center mount 8 to the safety latch housing 10.

The guard includes a pair of shields 6a and 6b that are hinged onto the center mount 8 by hinging mechanisms 18a and 18b. It is preferred that a standard hinge known in the art and shown in FIG. 1 is utilized in the present invention. The hinging mechanisms 18a,18b allow each shield 6a,6b to be swung from an open position to a protective position for use during vehicle movement or when rocks and earth are dropped onto the bed of the vehicle. The shields are dimensioned and configured in a squared-C shape to cover the segments of the exposed axle housing and hinged to rotate horizontally towards the longitudinal centerline of the truck, enabling quick inspection, cleanup and repair of axle components.

To prevent the movement of the shields while in a protective position, a pair of mounting brackets 12a and 12b (see FIGS. 2 and 3) secure each one of the shields to a different one of each of the shock housings 26a,26b of the vehicle. The mounting brackets 12a,12b are attached to the pair of shock housings 26a and 26b preferably by arc welding. The mounting brackets 12a,12b include a hole which is positioned in registry with a corresponding shield opening (7a or 7b) of the shields 6a and 6b. Threaded bolts, 20a and 20b, are provided to secure each of the shields to the mounting bracket 12a, 12b. The bolt is passed through both the shield opening 7a,7b and the hole of the mounting bracket 12a,12b and secured with a matingly threaded nut, 58a and 58b, threaded onto its respective bolt 20a,20b, thereby tightening the bolt, shield and nut assembly to the mounting bracket.

When the shields 6a and 6b are locked into place, lateral end segments 50a and 50b of the axle housing 30 and its proximate components, including an oil filter housing 16, differential sight glass 28, and covered segments of various lines, cables, etc. 52 are effectively protected from most debris and falling rocks.

Figure 2:
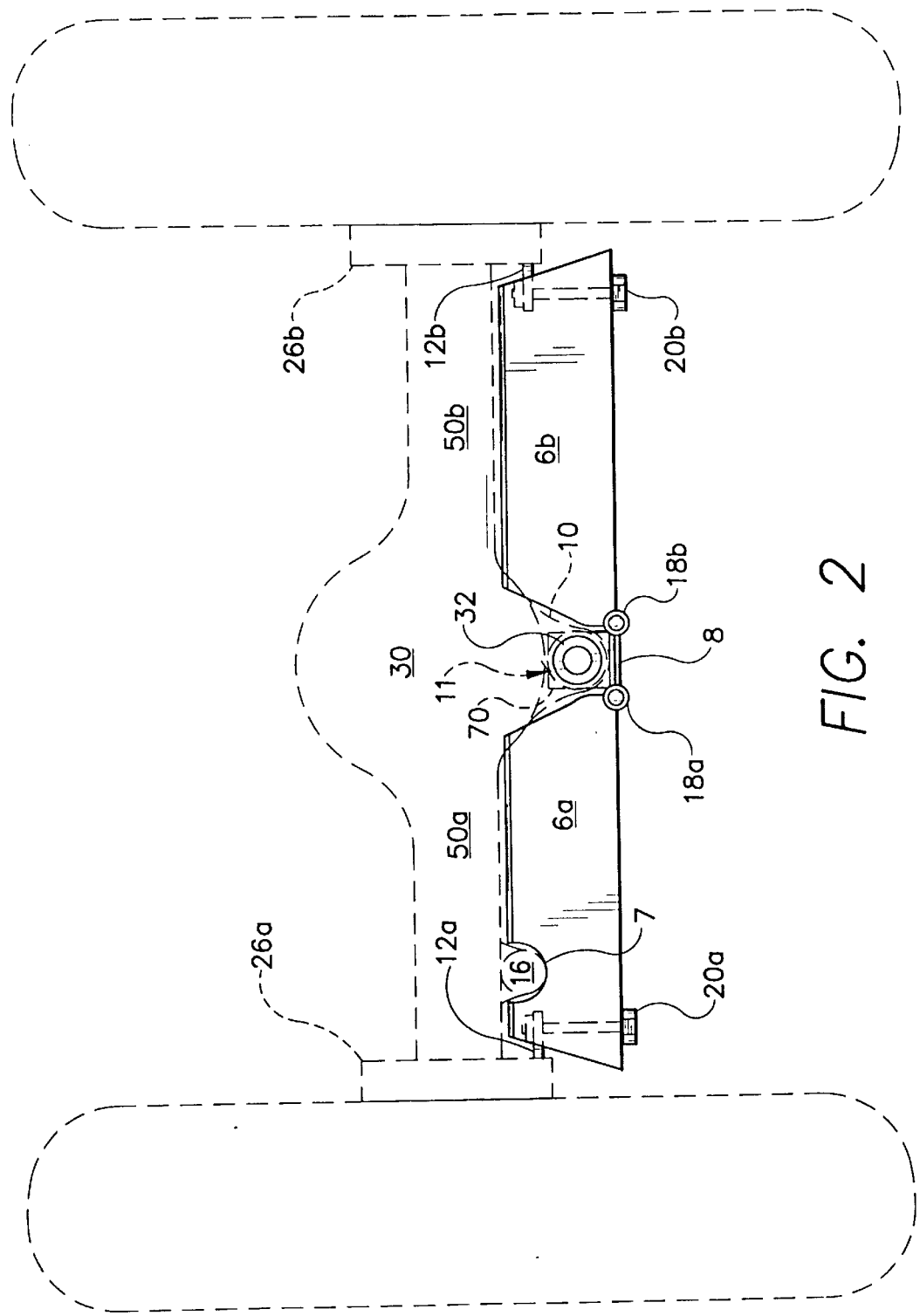
FIG. 2 is a plan view of the guard shown in FIG. 1.

FIG. 2 shows a plan view of the guard 2 that is secured onto the safety latch housing 10 and mounting brackets 12a and 12b. The first shield 6a includes a contoured portion 7 defining a recess that matches the outer oval shape of the oil filter housing 16. The shield 6a therefore effectively protects the most vulnerable portions of the oil filter housing 16 without need for alteration of the axle component. It is preferred that the applicant's invention is shaped to custom-fit around the components that need protection.

FIG. 3 shows a plan view of the guard 2 with the bolts 20a and 20b detached from their respective mounting brackets 12a and 12b, and corresponding nuts 58a and 58b. In FIG. 3, the shields 6a and 6b are shown partially swung outward toward the rear of the vehicle. These types of shield movements allow for the quick inspection, maintenance and cleanup of the components that are enclosed by the guard 2.

Figure 5:
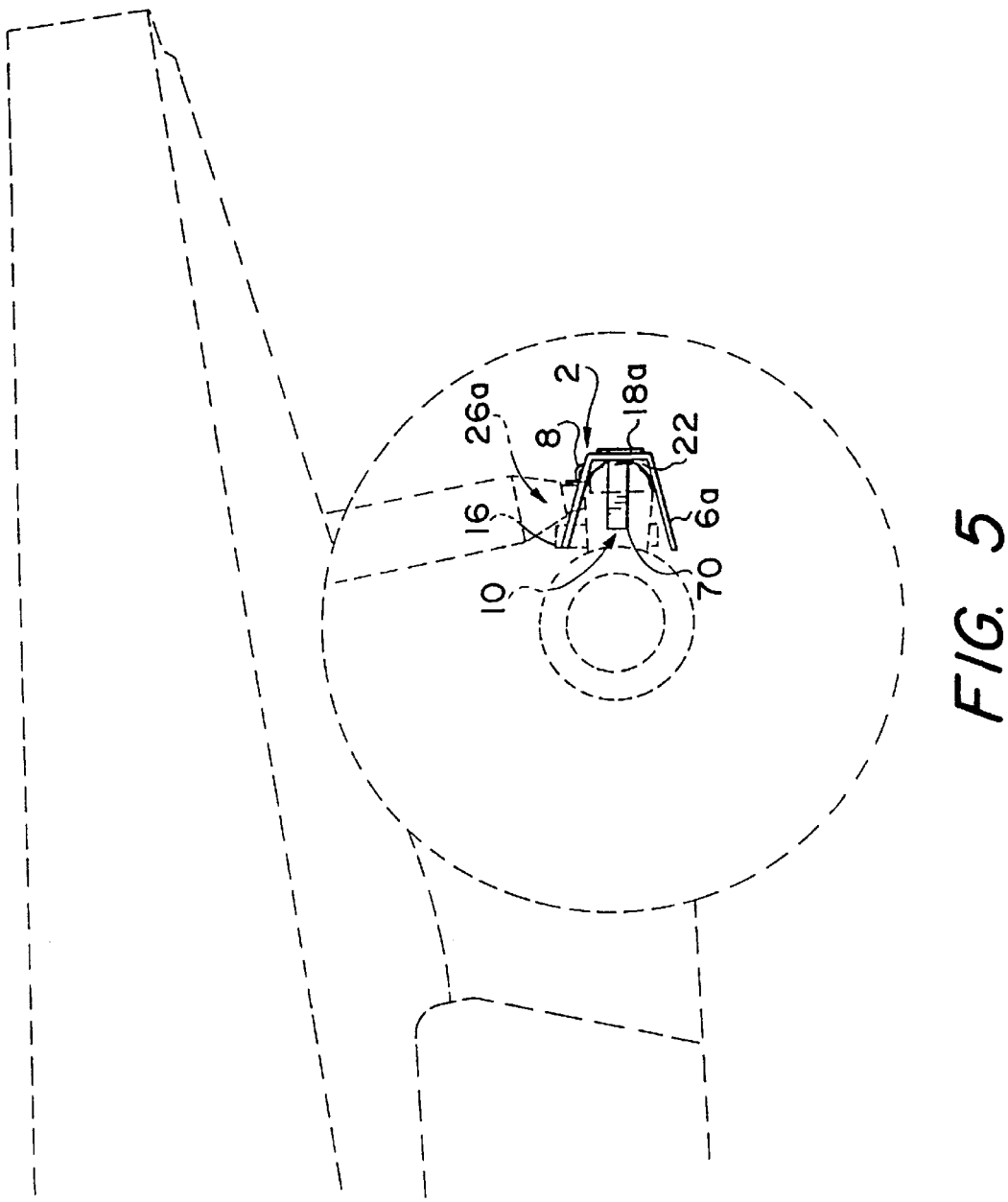
FIG. 5 is a side elevational view of the guard attached onto the safety latch housing and shock housing of a truck.

FIG. 5 is an elevated side view of the guard attached to the left shock housing 26a and safety latch housing 10 of the rock truck in FIG. 4. A left contoured edge 22 is preferably welded onto the shield 6a to reinforce the overall structure. The contoured edge 22 is tailored to prevent lateral penetration of debris into the guard toward the axle housing 30, since the edge 22 matches the rounded face of the shock housing 26a. One such customized edge is substantially a half-moon design. Likewise, the right edge (not shown) of shield 6b is comparably made.

In terms of manufacture, metal plates, preferably steel, are cut and welded to form the guard 2. In another embodiment, components of the guard 2 are shaped by using specialized metal plate bending machines that are known to persons skilled in the art, to substantially reduce the number of welds that are necessary to make the guard 2. Hinge means 18a and 18b are derived from designs that are known to persons skilled in the art.

It is to be understood that the present invention is not limited to the embodiments described above, but encompasses any and all embodiments within the scope of the following claims.

I claim:

1. A guard for protecting an axle housing and proximate components of a vehicle, comprising:

a central mount;

a first shield;

a second shield;

means for hinging the first shield and the second shield onto said mount;

means for detachably attaching the mount onto an axle housing; and means for detachably securing each of the first shield and the second shield in close proximity to the axle housing and its proximate components.

2. The guard for protecting an axle housing and proximate components of a vehicle according to claim 1 wherein the means for hinging is a hinge and pin assembly permitting each shield to independently swing horizontally from the central mount.

3. The guard for protecting an axle housing and proximate components of a vehicle according to claim 1, wherein each of the shields includes a customized end shaped to mate with the axle housing thereby substantially preventing lateral entry of debris into the guard.

4. The guard for protecting an axle housing and proximate components of a vehicle according to claim 1, wherein the customized edge is substantially a half-moon design.

5. The guard for protecting an axle housing and proximate components of a vehicle according to claim 1, wherein the first shield defines a recess for closely fitting around a rear-axle oil filter housing.

6. The guard for protecting an axle housing and proximate components of a vehicle having a safety latch housing depending from the axle housing, the safety latch housing defining a vertical channel for receiving a latch locking means and further defining a horizontal passage intersecting the vertical channel, and having a latch locking means adapted for insertion into the vertical channel, the guard comprising:

a central mount including a slide-in member adapted to slide into the horizontal passage and defining a receiving aperture positioned to align in registry with the vertical channel;

a first shield;

a second shield; and means for hinging the first shield and the second shield onto said mount.

7. The guard for protecting an axle housing and proximate components of a vehicle according to claim 6, comprising means for detachably securing each of the first shield and the second shield in close proximity to the axle housing and its proximate components.

8. The guard for protecting an axle housing and proximate components of a vehicle according to claim 7, wherein the first shield and the second shield each define a shield opening, and wherein said means for detachably securing includes a first mounting bracket and a second mounting bracket, each having an attaching edge and a receiving hole, the attaching edge affixed onto a predetermined mounting point near the axle housing such that the receiving hole of one mounting bracket is aligned in registry with the shield opening of one shield, and a pair of bolts each for removable insertion through a shield opening and through the receiving hole of the mounting bracket, and a pair of nuts each for securing each bolt tightly to the shield and mounting bracket.

9. The guard for protecting an axle housing and proximate components of a vehicle according to claim 6 wherein the means for hinging is a hinge and pin assembly permitting each shield to independently swing horizontally from the central mount.

10. The guard for protecting an axle housing and proximate components of a vehicle according to claim 6, wherein each of the shields includes a customized end shaped to mate with the axle housing thereby substantially preventing lateral entry of debris into the guard.

11. The guard for protecting an axle housing and proximate components of a vehicle according to claim 6, wherein the customized edge is substantially a half-moon design.

12. The guard for protecting an axle housing and proximate components of a vehicle according to claim 6, wherein the first shield defines a recess for closely fitting around a rear-axle oil filter housing.

* * * * *